June 25, 1935.  R. E. HELLMUND ET AL  2,005,894
SHIP PROPULSION AUTOMATIC STABILITY CONTROL
Filed March 30, 1934   2 Sheets-Sheet 1

WITNESSES:
C. J. Weller.
Paul E. Friedemann.

INVENTORS
Rudolph E. Hellmund &
Allan D. Forbes.
BY
W. R. Coley
ATTORNEY

WITNESSES:
C. J. Weller.
Paul E. Friedemann

INVENTORS
Rudolph E. Hellmund &
Allan D. Forbes.
BY
W. R. Coley
ATTORNEY

Patented June 25, 1935

2,005,894

UNITED STATES PATENT OFFICE 2,005,894

SHIP PROPULSION AUTOMATIC STABILITY CONTROL

Rudolph E. Hellmund, Swissvale, and Allan D. Forbes, Wilkinsburg, Pa., assignors to Westinghouse Electric & Manufacturing Company, East Pittsburgh, Pa., a corporation of Pennsylvania Application March 30, 1934, Serial No. 718,264

19 Claims. (Cl. 172—8)

This invention relates to control systems for motors and generators and more particularly the invention relates to a stability control for a motor and generator or motors and generators utilized in a ship propulsion system.

In power systems where a motor is connected to a generator and the capacity of the motor is somewhere near that of the generator, any variations of load on the motor may very materially change the voltage of the generator. Furthermore, for a constant excitation of the generator, the load variations on the motor may cause the motor to pull out of step or out of synchronism if the motor be a synchronous motor, or to drop its load if the motor be an induction motor. This danger of having the motor pull out of step or drop its load is particularly great whenever the generator is operated at a variable speed as is the case in ship propulsion systems and whenever a variable speed turbine drives the generator and the speed of the motor is determined by the frequency of the supply by the generator.

It is thus very important to know when the operation of the motor approaches the point where it might drop out of synchronism or drop its load; namely, it is important to know the stability of the system. Furthermore, if the excitation of the generator or motor or both can be made to be proportional to speed, or frequency, of the generator and motor, a substantially constant stability may be maintained.

It would seem at a first and cursory consideration that if the excitations of both the motor and generator is kept high, an appropriate stability may be maintained regardless of the voltage and frequency variation, but such is not the desirable operation because if the motor and generator are to be operated to be stable for all variations in speed and voltage, the efficiency of the system is very much impaired since such operation would necessitate a heavy excitation of the generator field, and, if a synchronous motor be used, a heavy excitation for both the generator field and the motor field. It is thus desirable that the motor be operated at some point near its pull-out condition and yet not sufficiently near that point to involve dangerous operation.

One object of this invention is to control the stability of a power system by varying the excitation of at least one of the machines in such a manner that appropriate stability is maintained for the system.

Another object of my invention is to indicate the margin of stability and also to control the excitation of the generator as a function of the frequency of the supply for one range of operation and in such a manner for another range of operation as to hold the power factor constant.

A further object of my invention is to indicate the stability and also control the excitation of certain electrical units in the power system as a function of the frequency in the system and the mechanical displacement of certain electrical units with reference to each other.

Other objects and advantages will become more apparent from a study of the following specification when considered in conjunction with the accompanying drawings, wherein.

Figure 1:
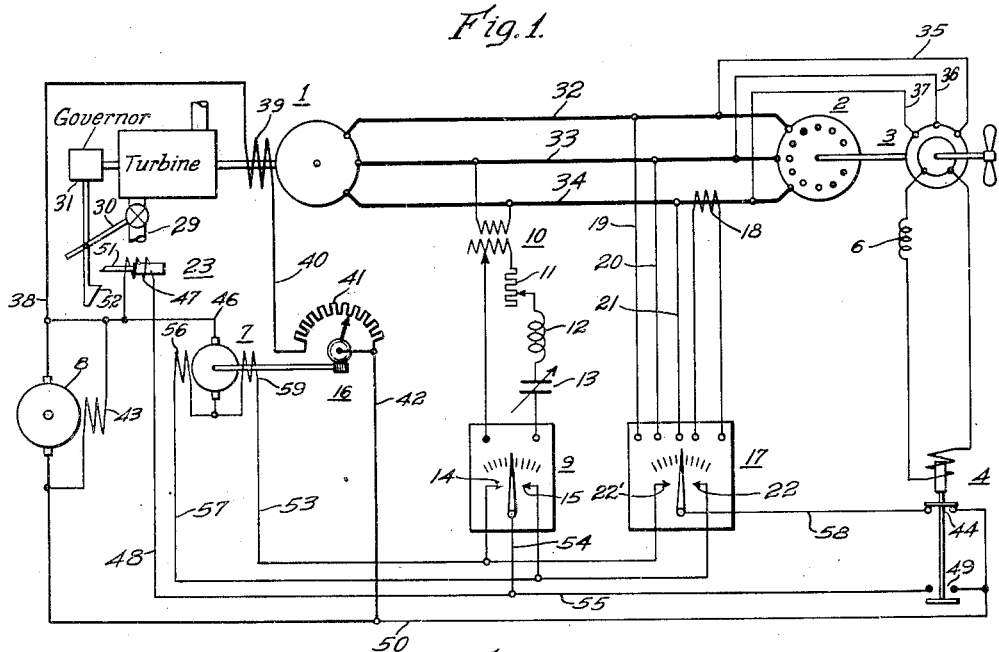
Fig. 1 is a diagrammatic showing of a ship propulsion system utilizing a single motor and a single generator driven by a turbine.

Referring more particularly to Fig. 1, which designates a main generator 1, or alternator, driven by a turbine, the speed of which may be varied by varying the admission of steam from the pipe 29 through appropriate actuation of the valve 30 through the governor 31 or by reason of manual actuation of valve 30. An induction motor 2 is connected to the main generator by conductors 32, 33 and 34 and a second or wound rotor induction motor 3 is mounted directly on the shaft of the motor 2 and has its primary winding connected to the conductors 32, 33 and 34 by conductors 35, 36 and 37.

A self excited exciter 8 having the field winding 43 is provided for exciting the field winding 39 of the main generator and a motor driven rheostat 16 driven by the motor 7 is provided to vary the excitation of the field winding 39.

A ratio measuring device 9 is interconnected with conductors 33 and 34 through the transformer 10 and is substantially responsive to the ratio of the voltage appearing between conductors 33 and 34 and a function of its frequency. This ratio responsive device is provided with a variable resistor 11, a reactor 12 and a capacitor 13. Because of the resistor, reactor and capacitor, the tendency of the pointer of the ratio responsive device 9 to deflect in such a direction as to cause an increase in excitation of the generator, will be greater and greater for successively lower frequencies of the generator, because the ratio of the voltage to the frequency will change therefore providing a greater and greater stability margin for the lower speeds as the speed decreases.

A power factor relay 17 is also provided for the control system and is interconnected with the conductors 32, 33 and 36 by the conductors 19, 20 and 21, energized as a function of the voltage of the main generator 1, and the transformer 18, energized as a function of the current supplied to the motor 2. A relay 4 is interconnected with a secondary winding of the wound rotor induction motor 3 and by reason of the contact members 44 and 49 power factor relay 17 for one range of operation controls the direction of rotation of the motor 7.

During maneuvering of a ship, the speed of the ship may have to be changed very rapidly from time to time and in consequence there may be danger of the motor dropping its load which would defeat the very object the helmsman had in mind in changing the speed of the turbine. Assuming that for any given condition the load of the motor 2 is a given amount and the frequency of the current supplied by the generator 1 has some definite value and that under such conditions, the voltage impressed on the relay 4 will not be sufficient to open the contact members 44, contact members 49 will be open. However, since there is no variation in load nor a variation in frequency nor voltage, the pointer of the device 17 will be in the mid-position and no variation of the excitation of the field winding 39 will take place, since the motor 7 will not operate.

If the speed of the motor 2 is decreased, thereby increasing the slip of the motor, the voltage across coil of relay 4 will rise and the current supplied to it will increase and in consequence the contact members 49 will close and contact members 44 will open. Reactor 6 is merely positioned in the circuit of the actuating coil of relay 4 to make the effect on the coil proportional to a function of the ratio of voltage to frequency.

As the speed of the turbine is increased there will be an increase in slip which will cause a relative decrease in the voltage of the generator 1. However, as the frequency increases, the voltage does not change in the same proportion by reason of a suitable choice of the values for the resistor 11, the reactor 12 and the capacitor 13 and in consequence the pointer of the ratio responsive device 9 will be displaced toward the left making contact at the contact member 14, thereby establishing a circuit from the upper terminal of the exciter through conductor 46, armature of motor 7, field winding 59 of motor 7, conductor 53, contact member 14 and the pointer of the device 9, conductors 54 and 55, contact members 49 and conductor 50 to the lower terminal of the exciter. The motor 7 being thus energized will operate the rheostat 10 in such a direction as to decrease the resistance value of the resistor 41 in circuit with the field winding 39. The field excitation of the generator is thus increased and the stability of the system is thus maintained despite the fact that there was an increase of torque on the motor 2. Motor 7 will continue to operate until sufficient sections of resistor 41 are removed from the field circuit—which circuit includes conductor 38, field winding 39, conductor 40, resistor sections 41 and conductors 42 and 50 to the exciter—of the main generator so that the pointer of device 9 is again disposed to its neutral or mid-position, thus indicating a proper stability through the speed of the motor, the frequency of the supply and the voltage of the supply may be entirely different than they were prior to the corrective action instituted.

If the turbine speed be decreased the slip will decrease and the pointer of device 9 will make contact at contact member 15 and in consequence, the motor 7 will be energized by a circuit from conductor 46 through the armature of the motor 7, field winding 59, conductor 57, contact member 15, the pointer of device 9, conductors 54 and 55, contact member 49 and conductor 50 to the lower terminal of the exciter. This corrective action will also continue until the pointer of the device 9 again indicates appropriate stability. The ratio responsive device 9 is primarily of utility during maneuvering when a somewhat greater margin of stability is necessary to preclude the possibility of having the motor drop its load when it would be particularly dangerous to have such dropping of the load take place.

Furthermore, during maneuvering, the steam supply to the turbine is usually controlled manually and there may be danger that by reason of such manual operation, the governor setting may be made too low and in consequence the motor may nevertheless drop its load or the entire system stall by reason of a faulty manipulation of the valve 30. To prevent any such improper manual manipulation, the closing of the contact members 49 also establishes a circuit for the stop mechanism 23 for the governor 31 and the valve 30. This circuit may be traced from the energized conductor 46 through actuating coil 47, conductors 48 and 55, contact members 49 and conductor 50 to the exciter. When coil 47 is energized, the armature will be actuated toward the left and the latching projection 51 will be in the path of the dog 52, thereby preventing a setting of the governor below a predetermined value, namely when dog 52 engages latch 51, valve 30 will still be open by an amount sufficient to properly operate the turbine at some low speed.

During cruising, the slip of the motor 2 will be much less and in consequence the relay 4 will be in the position shown in Figure 1. During cruising, it is, however, still important that an appropriate margin of stability be maintained although this margin of stability may be less than for maneuvering. To thus change the margin of stability thereby increasing the efficiency of the system, the power factor relay 17 is adapted to cooperate with the motor 7, whereas the ratio responsive device 9 is disconnected and can effect no controlling action by reason of the fact that contact members 49 are open.

During the cruising when there are any variations in torque due to the relatively small changes in speed that may be made there will be corresponding variations in the power factor of the system. Any such variations will change the margin of stability and are also undesirable since it is always desirable to maintain the power factor at a selected value. When the power factor varies from the selected value, the pointer of the power factor relay 17 will make contact with either the contact member 22 or 22' depending upon whether the power factor be less or more than the selected value. If the power factor be less than the selected value, contact will be made at the contact member 22, thereby energizing the motor 7 from the conductor 33 through conductor 46, the armature of motor 7, field winding 56, conductor 57, contact member 22, conductor 58, contact members 44 and conductor 50 to the exciter. As heretofore explained, energization of the field winding 56 causes an increase in the excitation of the field winding and in consequence the power factor will be brought back to its selected value. When it is brought back the pointer of the power factor relay 17 will again be in its neutral position, thereby stopping the operation of motor 7.

If the power factor becomes greater than the selected value, contact is made at contact member 22' and field winding 59 is energized and the excitation of field winding 39 is decreased until the excitation is again of such a value as to produce a power factor of the selected value.

Figure 5:
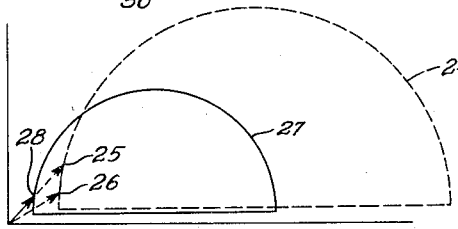
Fig. 5 shows two circle diagrams showing the variation in operation for different operating characteristics of the motor.

During the cruising, if it be considered the motor were originally running at a point 25 on the circle diagram 24 (see Fig. 5) and the torque be decreased, the power factor will become more lagging and the motor will be operating at a point 26 on the circle diagram 24. However, since the excitation is automatically decreased a new circle diagram will be necessary such as is shown in full line at 27 and the motor will be operating at a point 28 on the new circle diagram at the same power factor.

Figure 2:
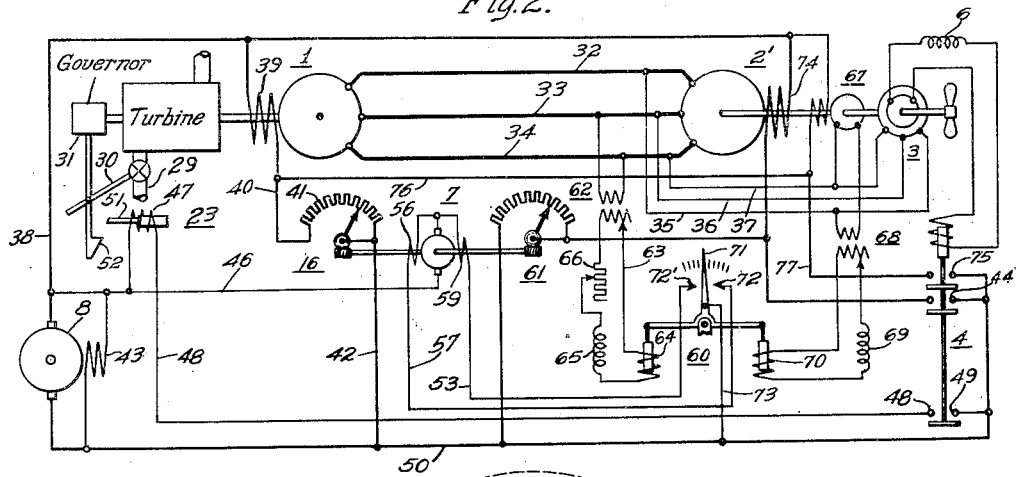
Figs. 2, 3 and 4 are modifications of the system shown in Figure 1, except that the particular control diagrams for controlling the stability of the system are different in these respective modifications than they are in the modification shown in Figure 1.

In the modification shown in Figure 2, corresponding elements have been given the same reference characters and only such elements as are not found in Figure 1 are referred to by different reference characters. The important feature about the modification shown in Figure 2 is that neither a ratio responsive device nor a power factor relay are utilized but the same result is obtained by a balanced relay 60.

In this instance, during maneuvering the left-hand coil 64 of the balanced relay 60 will be energized from the transformer 62 through conductor 63, coil 64, reactor 65, variable resistor 66, to the transformer 62. The relay 60 will also be energized from the conductors 32 and 34 and the small alternator 67. The circuit for the right-hand coil 70 may be traced from the transformer 68 through reactor 69, coil 70, back to the transformer 68.

The small alternator 67 is designed to have substantially the same voltage for different speeds as the main generator. Further, it should be noted that the armature of the alternator and the transformer 68 are interconnected with the conductors 32 and 34. The effect on coil 70 will thus be a function of the vectorial voltage difference between the voltages of the main generator 1 and the alternator 67. As long as the torque on motor 2' is such that there is only a normal mechanical displacement of the rotor of motor 2' with reference to the rotating electrical field of motor 2' the effect on coil 70 will be normal. The design of balanced relay 60 is such that for normal operation the pointer of relay 60 will be in the neutral position.

When the vectorial difference of the voltages of the two generators 1 and 67 increases, namely, when the rotor of alternator 67 shifts with reference to the rotating field produced by the main generator then the effect of coil 70 may overbalance the effect of coil 64, depending on the voltage and frequency of the supply, and thus pointer 71 makes contact with contact member 72. Pointer 71 and contact member 72 in fact come into engagement only when the ratio of the voltage to a function of the frequency is less than a certain value with reference to the angular displacement of the rotor of generator 67 with reference to its rotating field. Balanced relay 60 is thus a meter of the stability.

When contact is made at contact member 72, a circuit is established from the exciter 8 through conductor 46, the armature of motor 7, field winding 56, conductor 57, contact member 72, pointer 71, conductors 73 and 50 to the exciter 8. Motor 7 will thus operate rheostats 16 and 61 in such a direction as to increase the excitation of field windings 39 and 74 to thus maintain substantially constant stability.

Relay 4 in the modification shown in Fig. 2, so far as contact members 44 and 49 are concerned, functions exactly as in the modification shown in Fig. 1, but contact members 75 do not close except during reversing of the propeller by suitable reversing switches not shown. During such reversing the voltage of the wound rotor induction motor on the relay 4 will increase considerably with the result that contact members 75 will close thereby shunting the rheostats 16 and 61 for the field windings 39 and 74, respectively. The shunt circuit may be traced from conductor 40 through conductors 76 and 77, contact memebrs 75 to the conductor 50. During reversing both field windings 39 and 74 are thus automatically overexcited and the margin of stability is thus very much increased when most needed.

Figure 3:
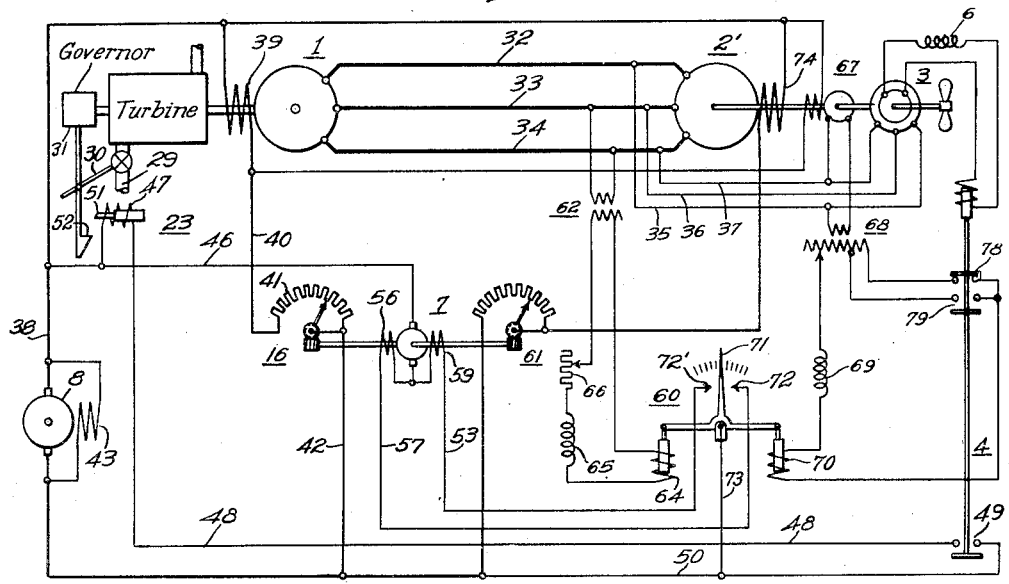

The modification shown in Fig. 3 is much like the modification shown in Fig. 2 except that provision is made for a different margin of stability for maneuvering than for cruising. This is accomplished by the cooperative action of relay 4 and the balanced relay 60 and the transformer 68 which is adapted to be automatically calibrated by the relay 4.

When the relay 4 is in the position shown during cruising contact members 78 are closed, whereas during maneuvering contact members 79 are closed. Closing of contact members 79 recalibrates relay 60 so that a stability margin is increased.

Figure 4:
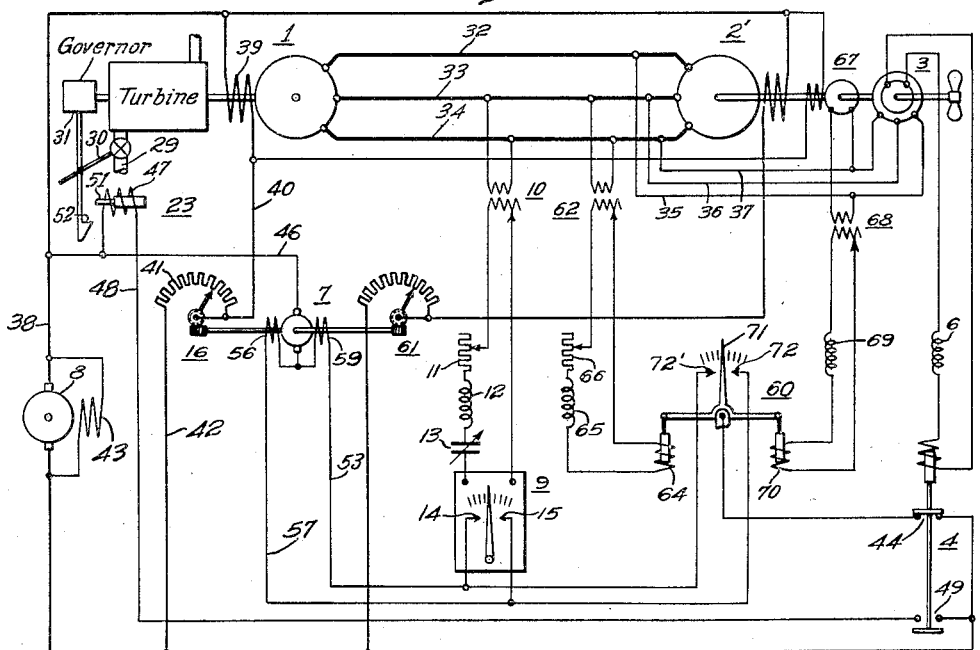

In the modification shown in Figure 4 the ratio responsive device 9 is not utilized during cruising and balanced relay 60 accomplishes the controlling action for maintaining a proper stability with variations of torque in the motor 2'. However, during cruising the balanced relay 60 is adapted to be energized by reason of the fact that contact member 44 will be closed. It should be noted that in this instance the transformer 62 is connected across two of the conductors, namely, 33 and 34, of the generator 1 and through the use of a variable resistor 66 and a reactor 65 coil 64 is energized as a function of the ratio of the voltage to the frequency multiplied by a variable. On the other hand, coil 70 is energized through a reactor 69 and the transformer 68 interconnected with the alternator 67 and the main generator 1 in the manner heretofore explained in connection with the discussion of Figure 3. As long as the voltage generated by the alternator 67 and that generated by the main generator 1 are in phase, or when the synchronous motor 2' has an appropriate angular lag, the pointer of the balanced relay 60 will remain in its mid position. However, when such is not the case, the pointer will make contact with either contact members 72 or 72', to energize the motor 7 to either increase or decrease the excitation of both the generator and the motor depending upon the correction that is needed to reestablish the desired stability.

Applicants are aware of the fact that the foregoing modifications will be illustrative of the invention and that others skilled in the art once having had the benefit of the teachings of this invention, can devise other circuit diagrams and further modifications without departing from the spirit of this invention. It is, however, understood that this invention is not limited to the specific modification disclosed and is only to be limited by the scope of the appended claims and the pertinent prior art.

We claim as our invention:

1. An electric power system such as is utilized in electric ship propulsion comprising a variable voltage and variable frequency dynamo electric machine and a propeller driving dynamo electric machine disposed to be connected to the first named machine, in combination with stability control means, said means including a pair of coils arranged to produce opposing effects, one of said coils being connected to be responsive substantially to the ratio of the voltage of the first-named machine to the product of a variable and the frequency of the first-named machine and the other of said coils being connected to be responsive to the torque of one of said machines.

2. An electric power system including a pair of variable speed dynamo-electric machines, in combination with stability control means, said means including a pair of coils arranged to produce opposing effects, one of said coils being connected to be responsive substantially to the ratio of the voltage of one of said machines to the product of a variable, decreasing with an increase of frequency, and the frequency of said machine, and the other of said coils being connected to be responsive to the torque of one of said machines.

3. An electric power system including a pair of variable speed dynamo electric machines in combination with stability control means, said means including a device responsive substantially to the ratio of the voltage of one of said machines to the product of a variable, decreasing with the frequency, and the frequency of said machine, and excitation control means controlled by said stability control means whereby there is an over-excitation with a decrease in the frequency of the voltage of one of said machines.

4. An electric power system including a variable speed alternator arranged to supply alternating current of variable frequency to a work motor, in combination with stability control means including a pair of coils arranged to produce opposing effects and connected to be responsive to the voltage of the alternator and responsive to the product of a variable and of the frequency of the alternator.

5. An electric power system including a variable speed alternator arranged to supply alternating current of variable frequency to a work motor, in combination with stability control means, means responsive to said stability control means for varying the excitation of said alternator, said stability control means being interconnected with the alternator and having electrical units making said stability control means responsive to a function of the ratio of the voltage of the alternator to the square of the frequency of the energy supplied to the work motor by the alternator.

6. An electric power system including a variable speed alternator arranged to supply alternating current of variable frequency to a work motor, in combination with stability control means responsive substantially to the ratio of the voltage of the alternator to the square of the frequency of the alternator and means responsive to a low frequency of the alternator to prevent a decrease of speed of the alternator below a predetermined value.

7. In an electric power system comprising two dynamo electric machines, means for driving one of the machines, interconnecting means between said machines whereby the other machine receives energy from the driven machine, means for indicating the stability of the machines, said indicating means being responsive substantially to the quantity $$\frac{E}{fs},$$

where $E$ and $f$ are the voltage and frequency, respectively, of the driven machine and $s$ is a variable decreasing with the frequency of the driven machine.

8. In an electric power system comprising two dynamo electric machines, means for driving one machine, interconnecting means between said machines whereby the other machine receives energy from the driven machine, means for varying the excitation of the driven machine, means responsive to the stability of the machine to control the excitation varying means, said stability responsive means being responsive substantially to the quantity $$\frac{E}{fs},$$

where $E$ and $f$ are the voltage and frequency respectively, of the driven machine and $s$ is a variable decreasing with the frequency of the driven machine whereby the excitation of the driven machine is varied out of proportion with the variation in the frequency.

9. In an electric power system comprising two dynamo electric machines, means for driving one machine, means for varying the speed of the driven machine, interconnecting means between said machines whereby the other machine receives energy from the driven machine, stability control means for varying the excitation of the driven machine, said stability control means being responsive substantially to the quantity of $$\frac{E}{fs},$$

where $E$ and $f$ are the voltage and frequency, respectively, of the driven machine and $s$ is a variable decreasing with the frequency of the driven machine and means responsive to the torque of the machine interconnected with the driven machine to control said stability control means and to prevent a decrease of the speed of the driven machine below a predetermined value.

10. In an electric power system comprising a dynamo-electric machine, a variable speed prime mover for driving the machine, a second dynamo electric machine disposed to receive energy from the first machine, excitation control means for varying the excitation of one of said machines, and stability control means for controlling the stability of said second machine by controlling the excitation control means, said stability control means being substantially responsive to the quantity $$\frac{E}{fs},$$

where $E$ is the voltage of the first named machine, $f$ the frequency of the current supplied to the second-named machine, and $s$ is a variable decreasing with the frequency of the first named machine.

11. In an electric power system comprising a dynamo electric machine, a variable speed prime mover for driving the machine, a second dynamo electric machine disposed to receive energy from the first machine, excitation control means for varying the excitation of said machines, and stability control means for controlling the stability of the second machine by controlling the excitation control means, said stability control means being responsive over a predetermined range of low frequency substantially to the quantity $$\frac{E}{fs},$$

where $E$ is the voltage of the first named machine, $f$ the frequency of the current supplied to the second named machine, and $s$ is a variable decreasing with the frequency of the first named machine and responsive over a predetermined range of higher frequency substantially to the quantity $$\frac{E}{f},$$

where $E$ and $f$ have the same meaning as hereinbefore stated.

12. In an electric power system comprising a synchronous generator, a variable speed prime mover for driving the generator to vary the frequency of the energy delivered by the generator, means for varying the excitation of the generator, a motor adapted to be connected to the generator, and means responsive to substantially the quantity $$\frac{T}{fs}$$

for controlling the stability of the motor by controlling the means for varying the excitation of the generator, where $E$ is the voltage of the generator, $f$ the frequency of the current supplied to the motor by the generator and $s$ is a variable decreasing with the frequency of the generator.

13. In an electric power system comprising a synchronous generator, a variable speed prime mover for driving the generator to vary the frequency of the energy delivered by the generator, means for varying the excitation of the generator, a motor adapted to be connected to the generator, means for varying the speed of the prime mover driving the generator, means responsive to the torque of the motor for controlling the means for varying the speed of the prime mover and means responsive to substantially the quantity $$\frac{E}{fs},$$

for controlling the stability of the motor by controlling the means for varying the excitation of the generator, where $E$ is the voltage of the generator, $f$ the frequency of the current supplied to the motor by the generator and $s$ a variable decreasing with the frequency of the generator, said means responsive to substantially the quantity $$\frac{E}{s}$$

being also controlled by said means responsive to the torque of the motor.

14. In an electric system, a synchronous generator the voltage and frequency of which may be varied, a motor connected to the generator, in combination with means for automatically increasing the relative stability of the generator and the motor by over-exciting the generator with a decrease in frequency.

15. In an electric system a synchronous generator, the voltage and frequency of which may be varied, a motor connected to the generator, in combination with means responsive to an increase in the ratio of the voltage of the generator to the frequency of the generator to automatically increase the relative stability of the generator by over-exciting the generator with a decrease in frequency.

16. In an electric system, a synchronous generator the voltage and frequency of which may be varied, a motor connected to the generator the excitation of which may be varied, in combination with means responsive to an increase in the ratio of voltage to frequency for automatically increasing the relative stability by over-exciting both the generator and the motor with a decrease in frequency.

17. In an electric system, a source of alternating current, the voltage and frequency of which may be varied, a motor connected to said source, and means for automatically increasing the voltage of said source with reference to the frequency of said source for a predetermined decrease in frequency for controlling the excitation of said motor and means responsive to the power of said motor to maintain the power factor substantially constant over a predetermined frequency range greater than the first mentioned range.

18. In an electric power system, such as is utilized on board a ship for electric ship propulsion, and including a variable speed prime mover, a synchronous generator driven at various speeds by said prime mover to thus generate energy of varying frequencies, means for varying the excitation of the generator, electromagnetic means responsive to the mechanical relation of the motor armature to the generator armature and also responsive to the ratio of the voltage to the square of the frequency of the generator for controlling the stability of the motor and generator.

19. The method of operating an electrically propelled ship having a variable speed variable voltage alternator, connected to operate a propeller driving motor which includes maintaining a predetermined ratio between the generator voltage and a function of the frequency of the generator thereby maintaining the alternator and motor excitation in such condition that there will be a selected stable operation for the motor and alternator.

RUDOLPH E. HELLMUND.
ALLAN D. FORBES.